Inventors
ALOIS ESSEX
ELMER E. GARRETT
WILLIAM G. HAMPTON
Attorney

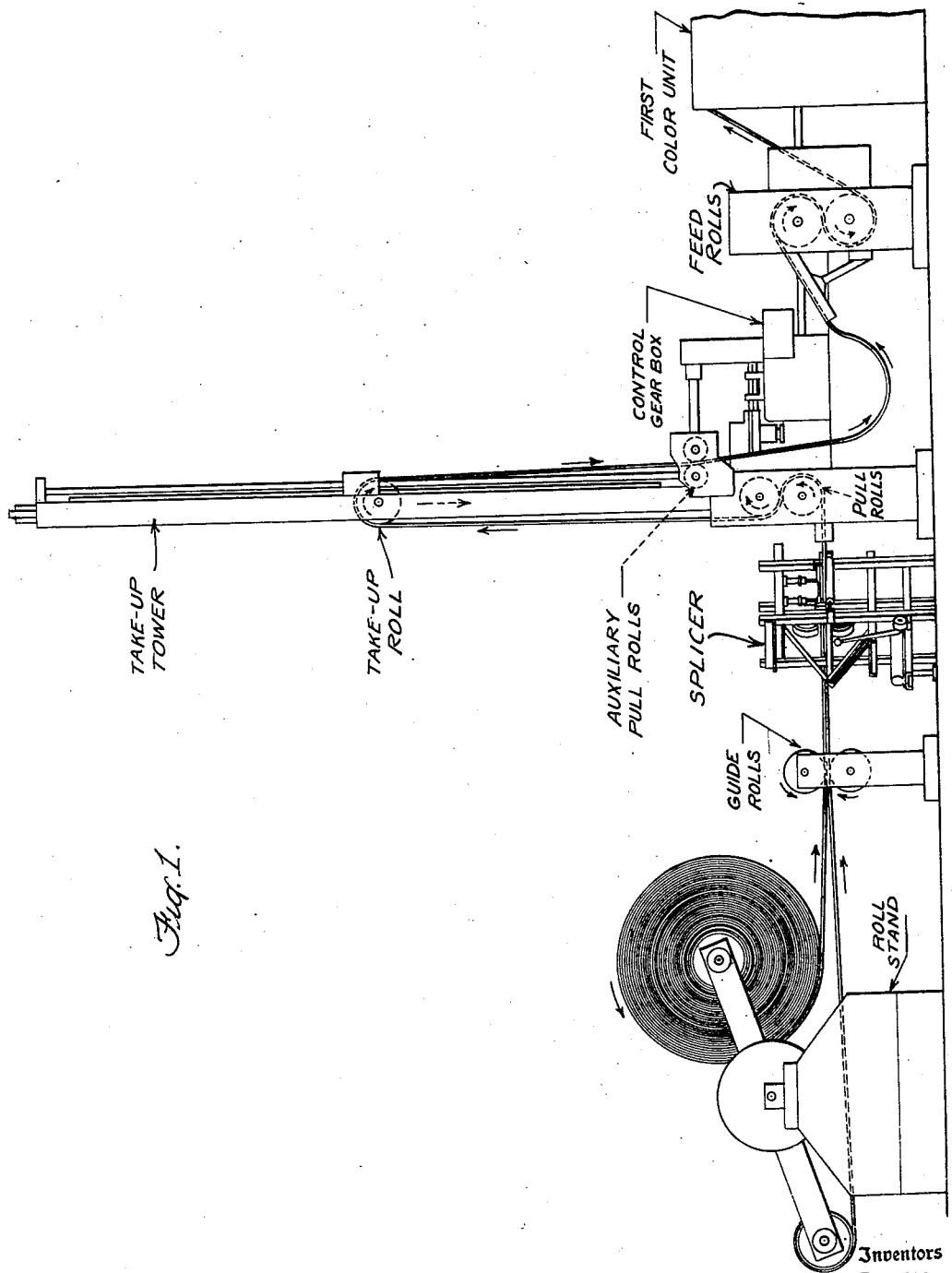

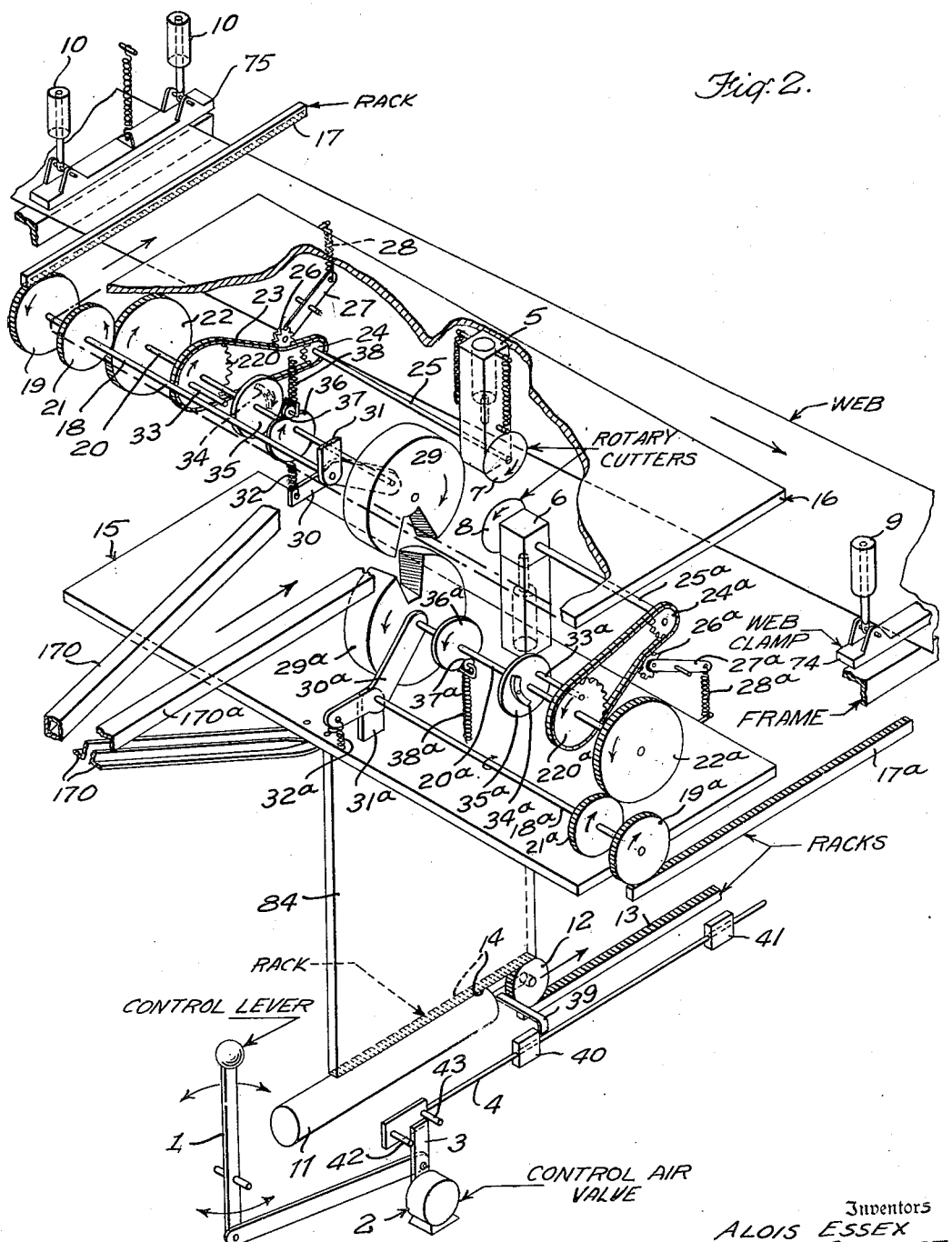

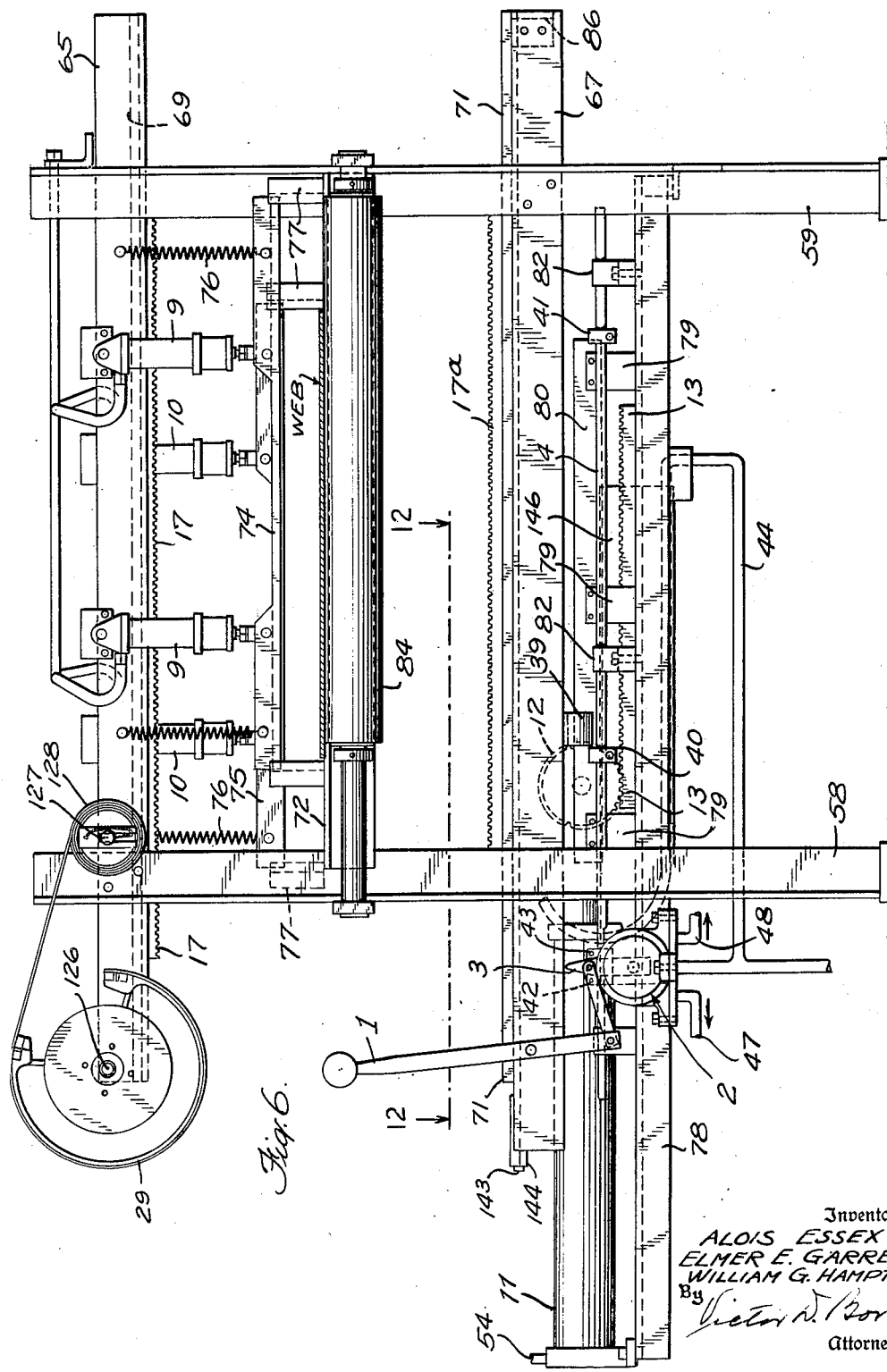

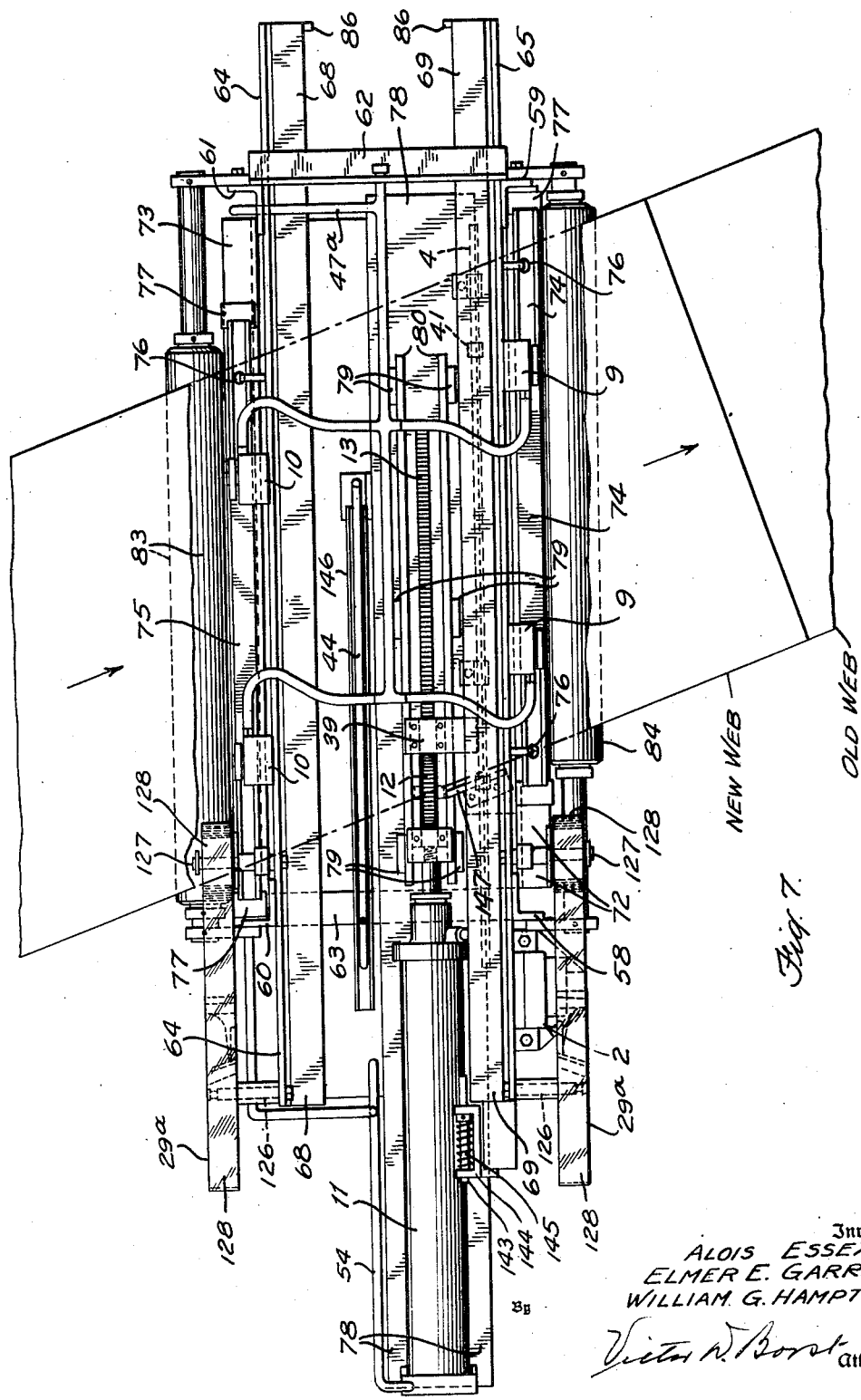

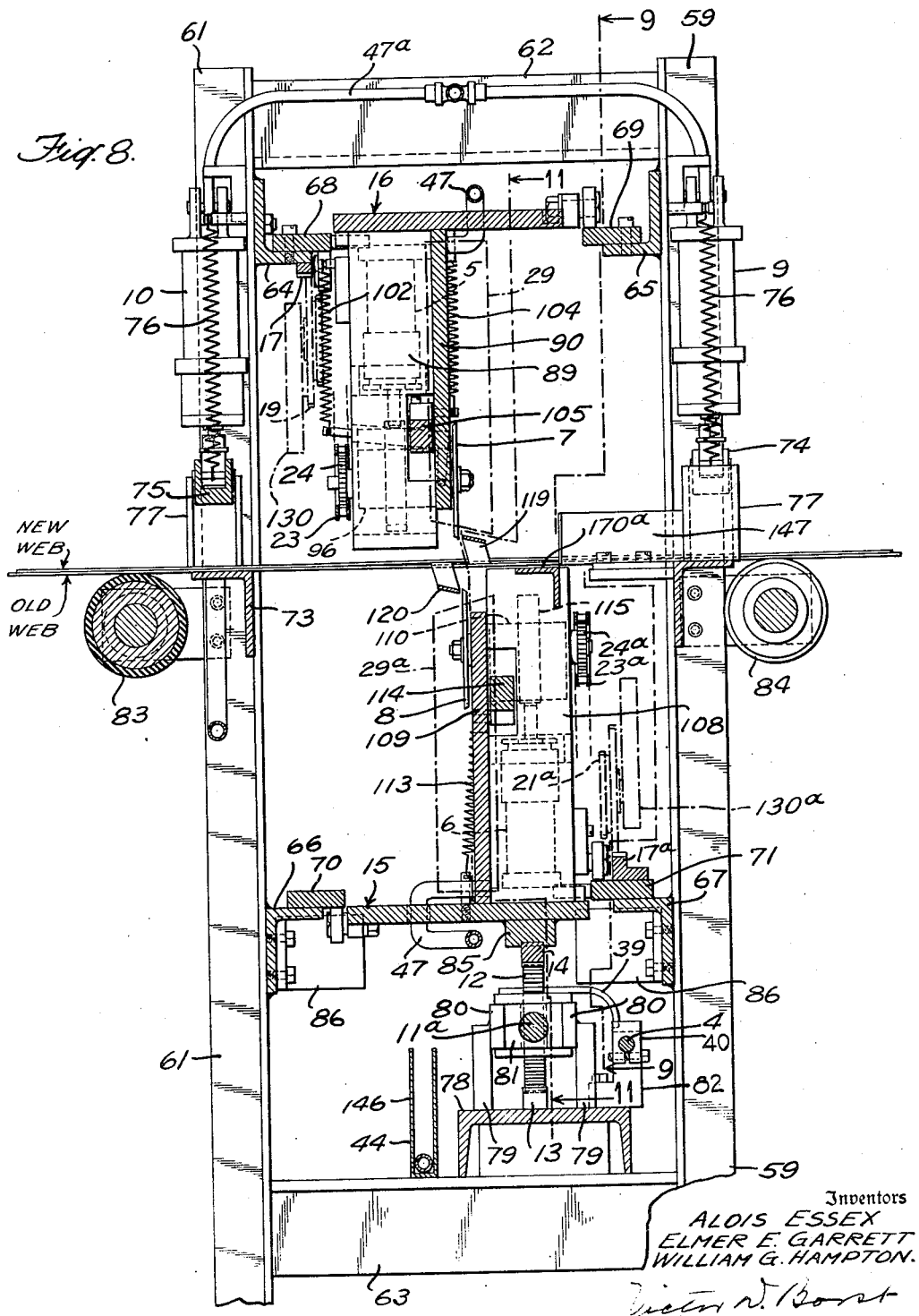

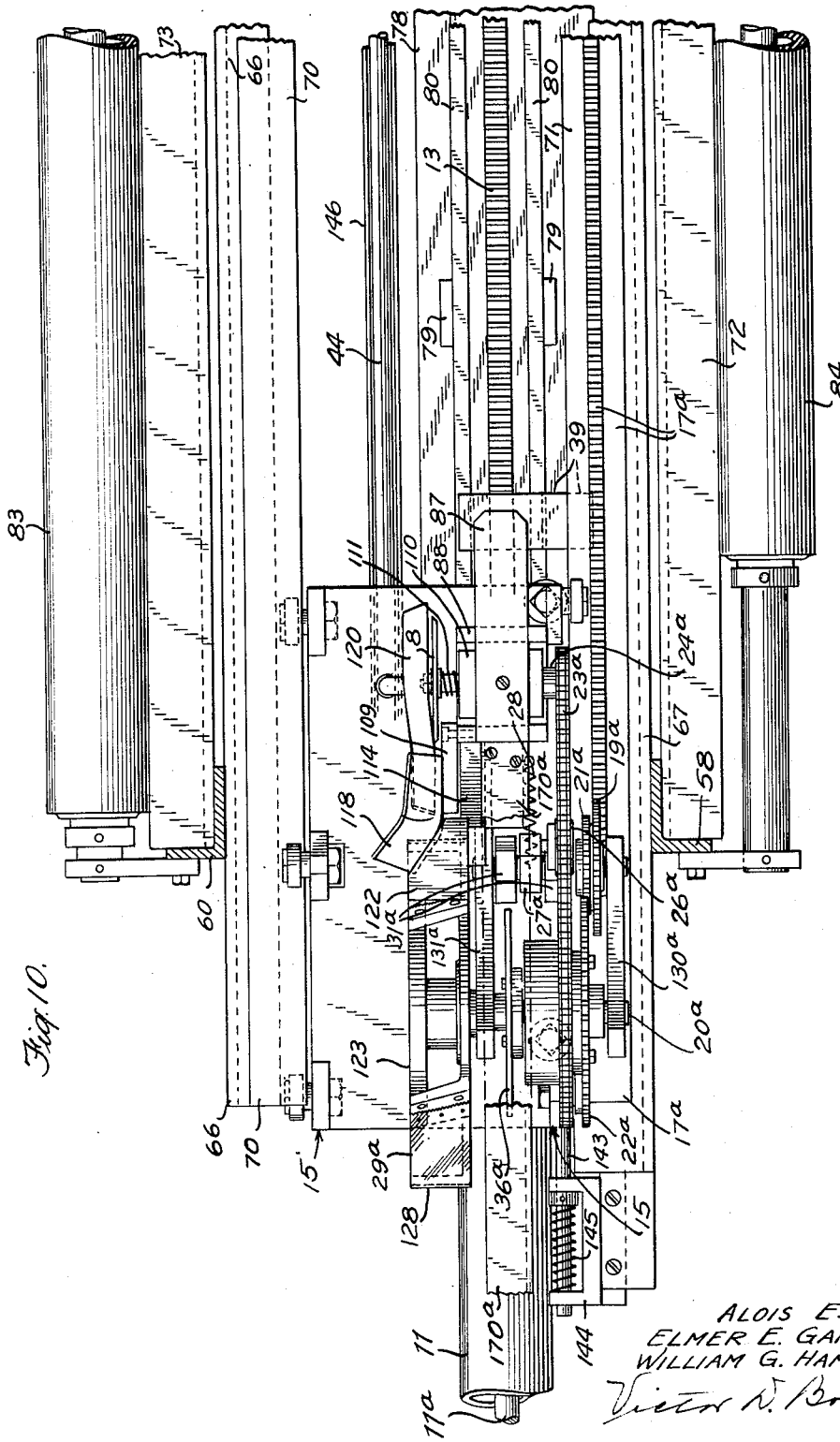

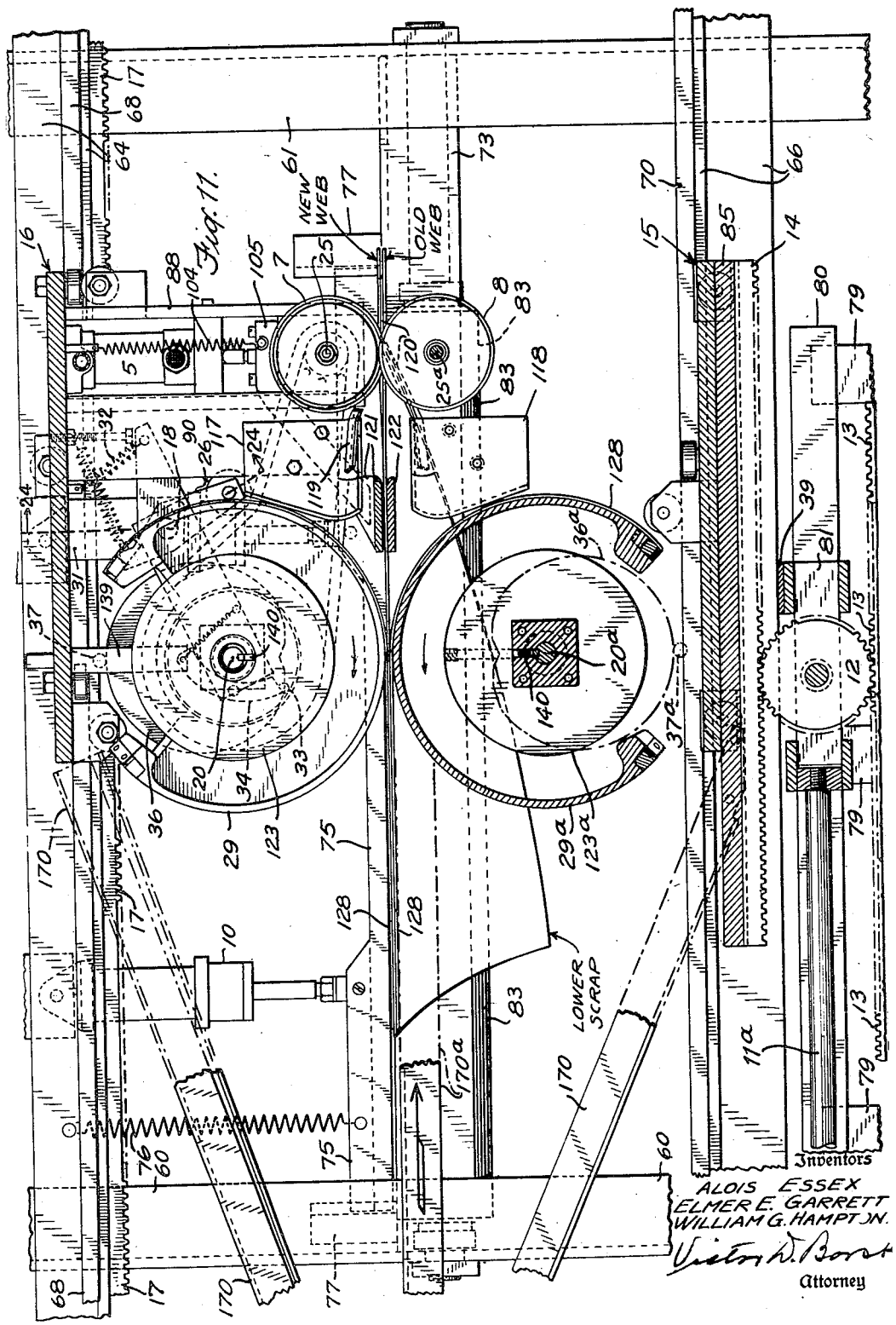

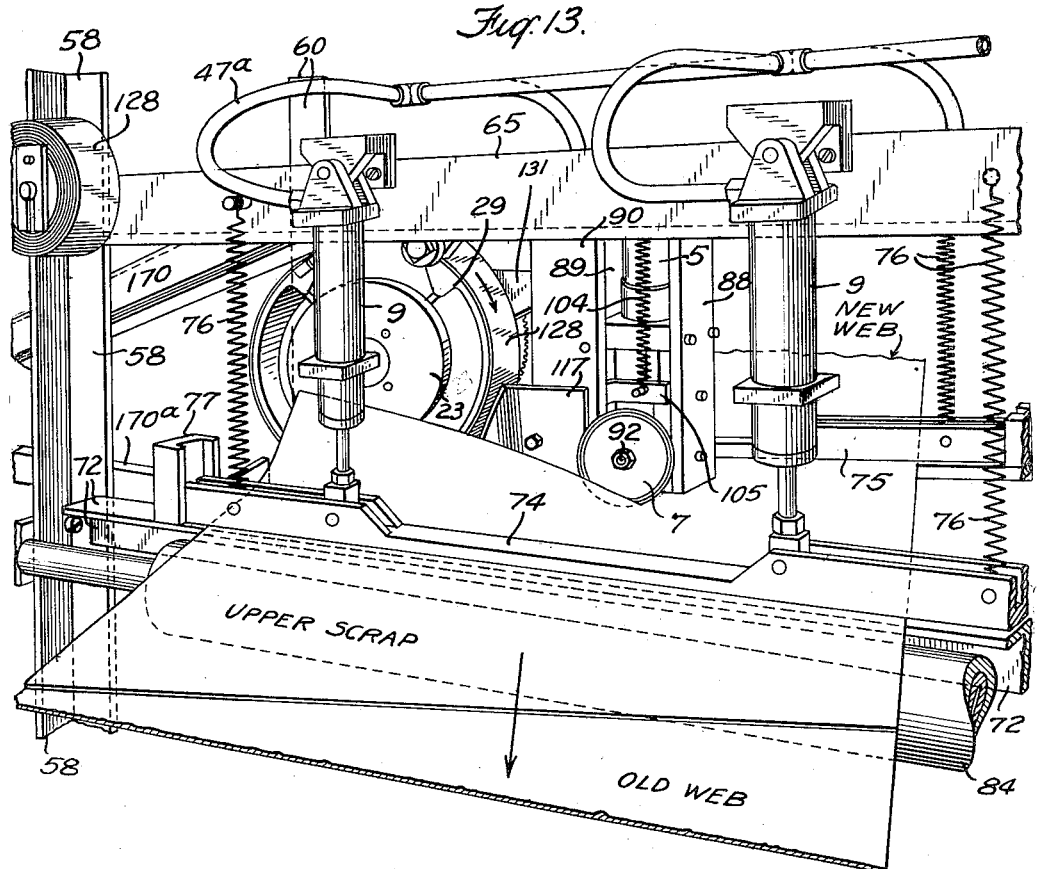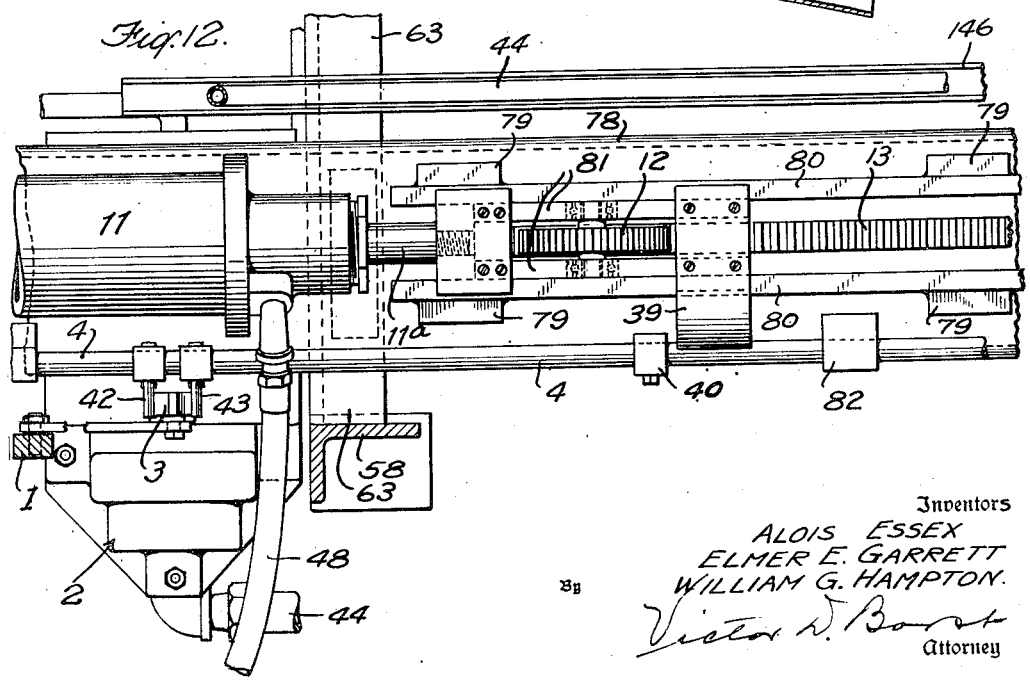

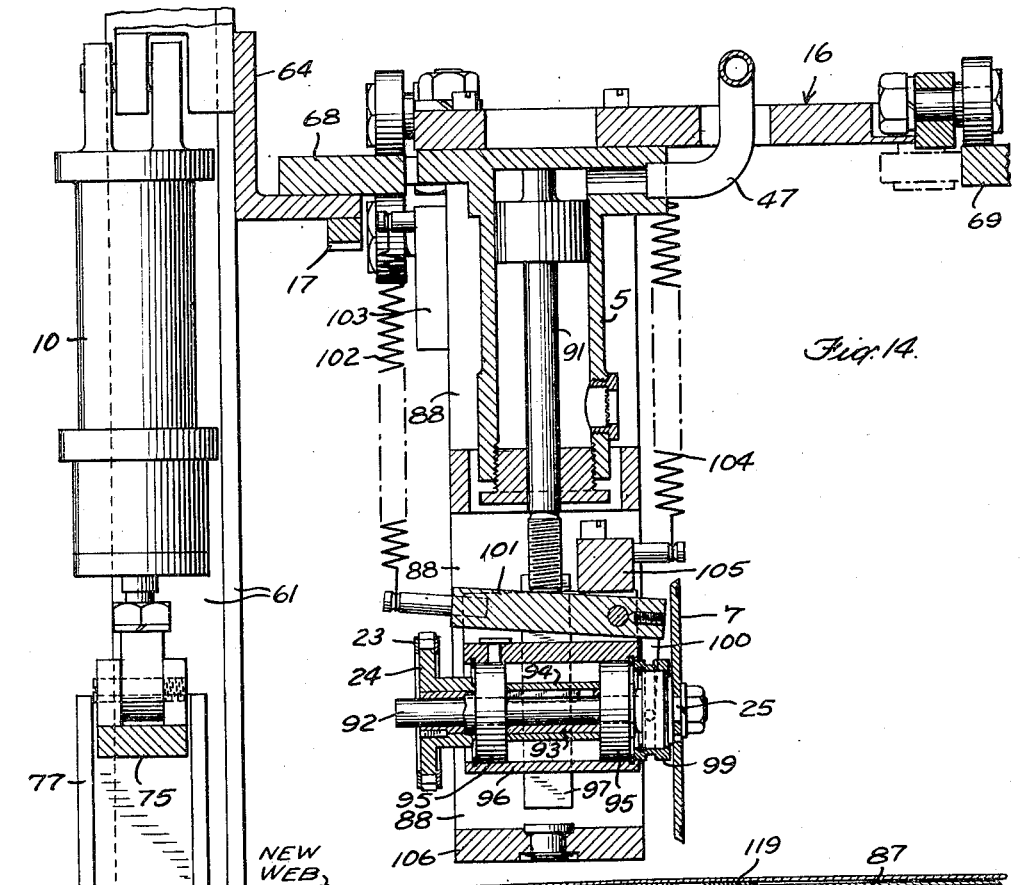
Fig. 14.
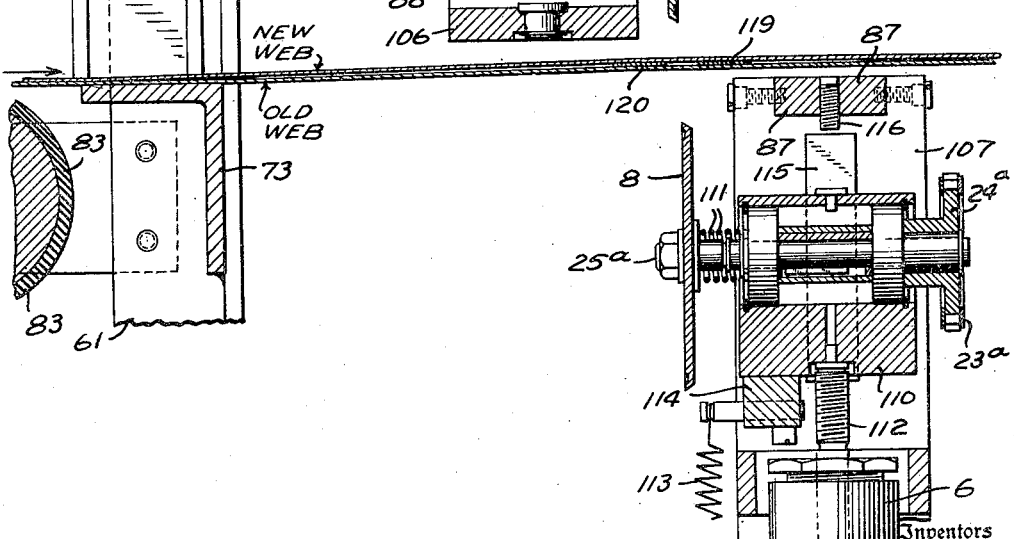

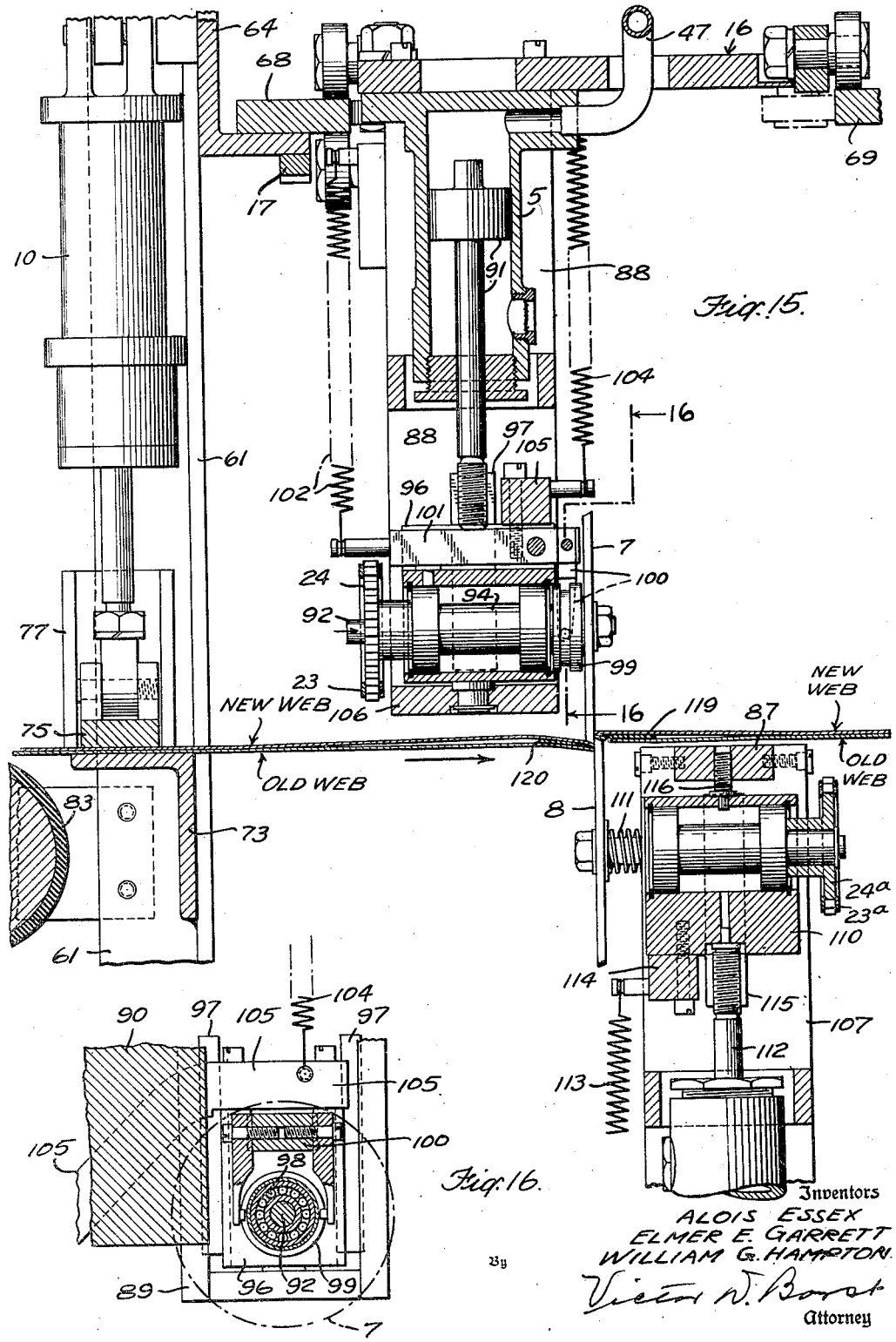

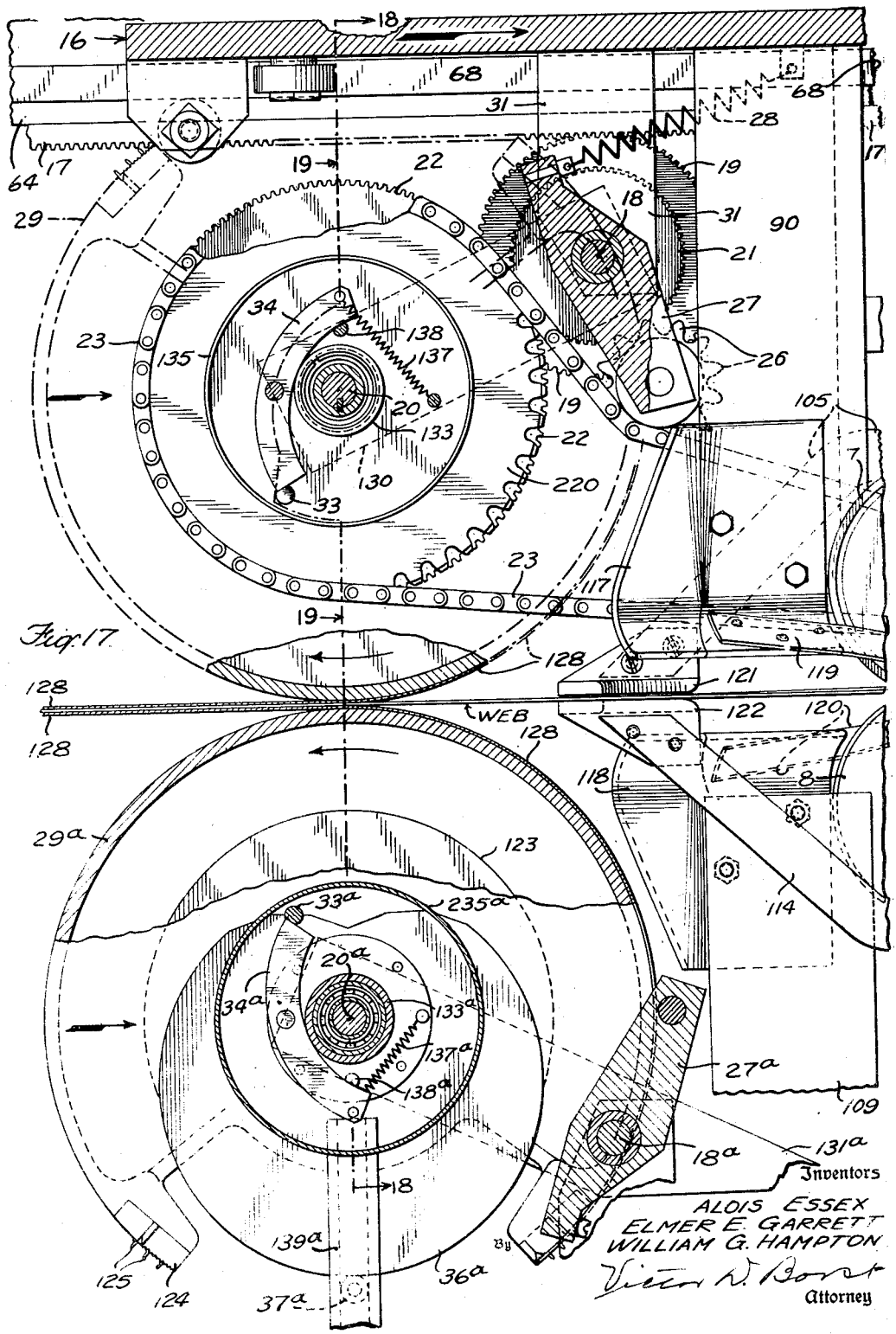

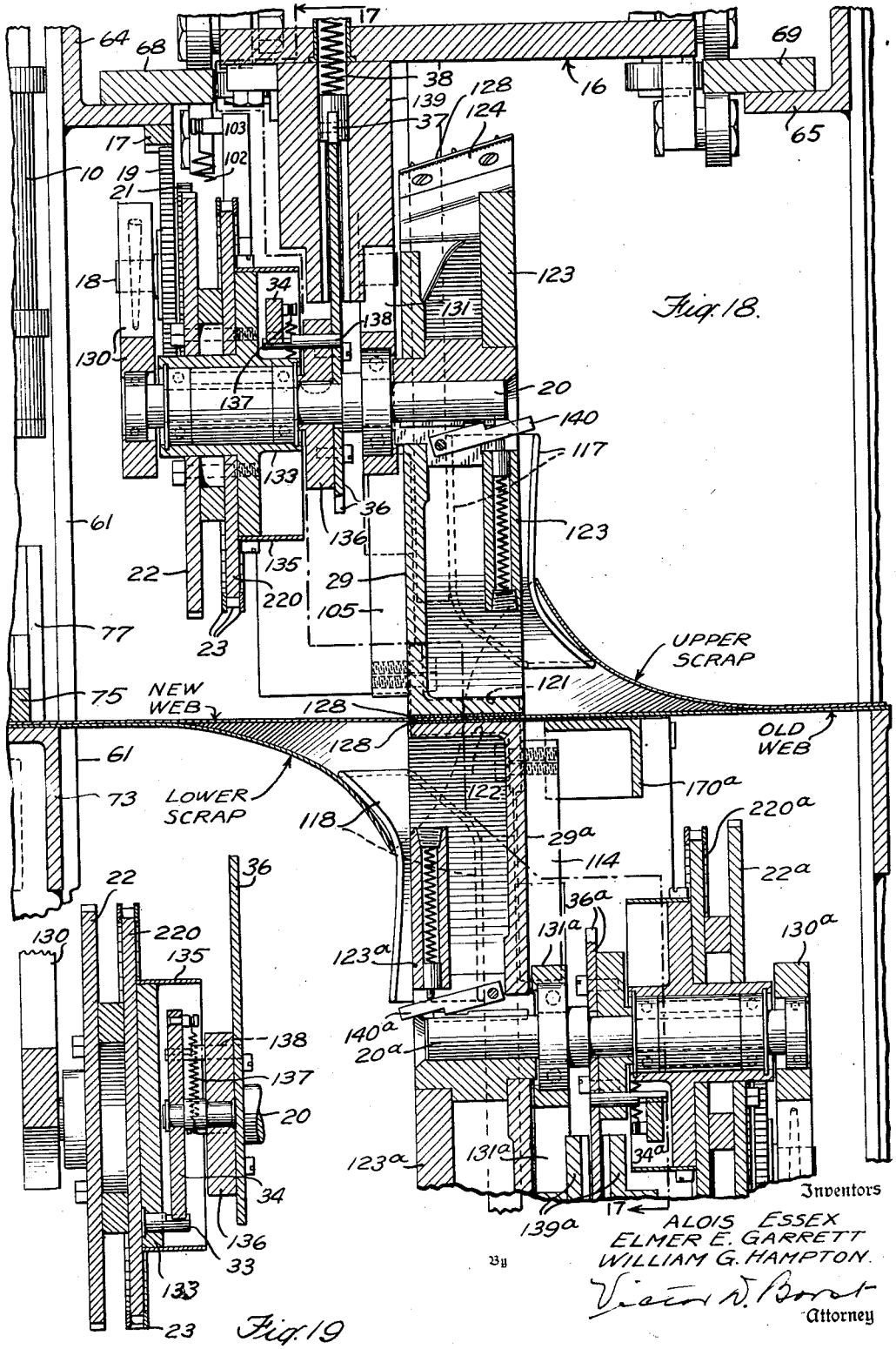

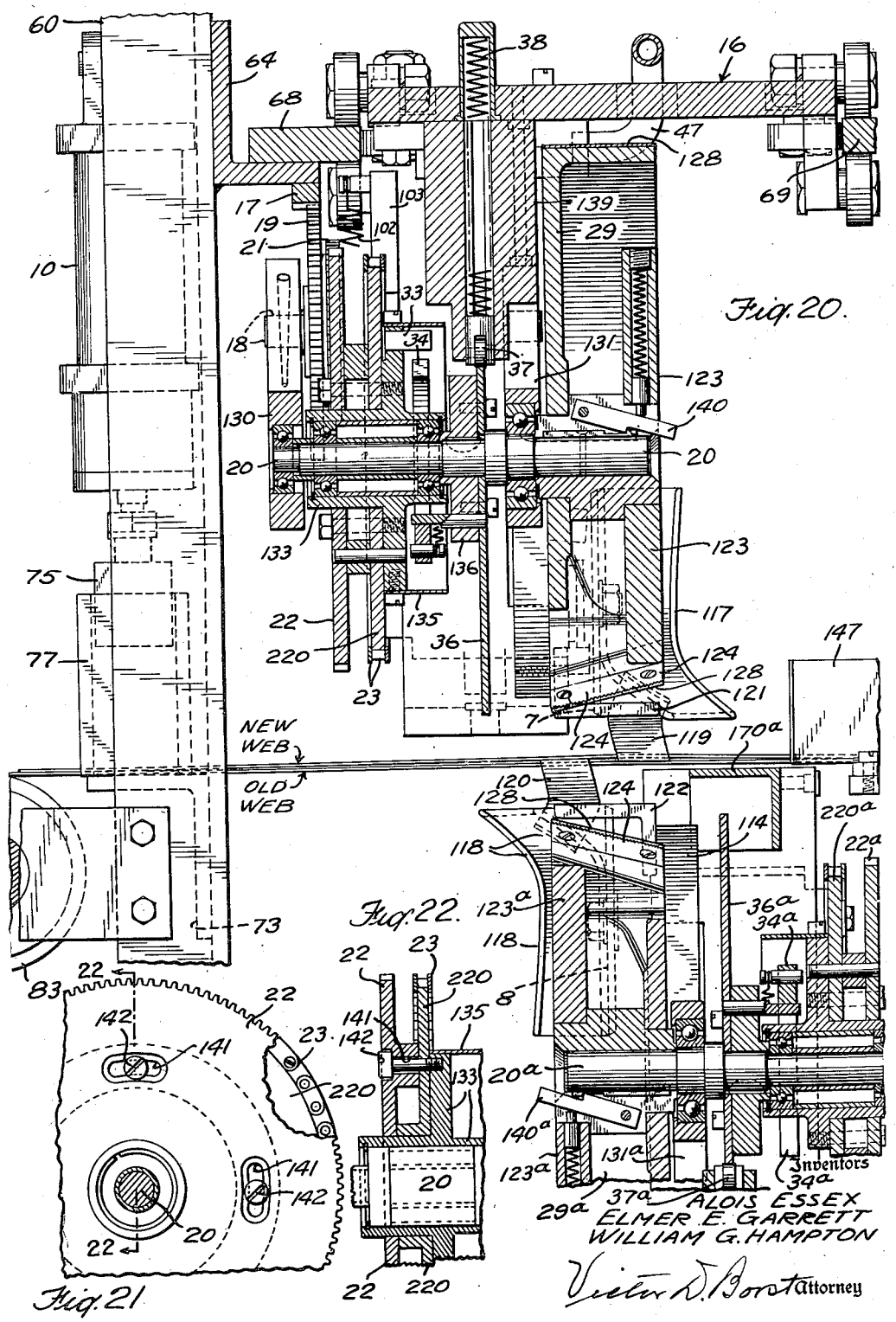

Patented Aug. 5, 1952

2,606,136

UNITED STATES PATENT OFFICE 2,606,136

APPARATUS FOR THE AUTOMATIC SPLICING OF WEBS

Elmer E. Garrett, Freeport, Alois Essex, Glendale, and William G. Hampton, Bayside, N. Y., assignors to The Sperry Corporation, a corporation of Delaware Application December 24, 1949, Serial No. 135,004

13 Claims. (Cl. 154—42.3)

This invention has an especial application in the field of paper-board box making and, although not limited thereto, it will be particularly described as employed in connection with the printing and blanking of paper-board stock to form carton blanks.

Web-fed rotary printers and rotary blankers have been developed and are in use which operate at a speed of several hundred feet per minute. The commercial rolls of paper-board weigh approximately one ton, and at the operating speed mentioned a roll of paper is used up each half hour or in less time. To make the operation continuous, the leading end of a new roll is spliced to the final portion of the web on the roll in use in butt relation, so that the web from the new roll makes a continuation of the old web.

Heretofore this splicing has been done by hand and has necessitated the temporary stopping of the press so that the webs are stationary during the act of splicing. Customarily the leading end of the new web is fed in on top of the web that is being used up, both supported on a suitable table, the press is stopped, the webs are sheared, the scrap ends are removed, the remaining ends are brought together and the joint is taped top and bottom.

In the speeds which have heretofore prevailed, the loss of time involved in the stopping of the presses and in the manual splicing operation, which in the trade is known as down time, has not been a serious factor. At the current speeds, however, it becomes virtually prohibitive.

Moreover, when the printing presses comprise multiple color units, registry is lost when the presses are stopped or slowed down below a critical speed and a substantial length of the board is spoiled with each splicing, with the result that the blanks from that length are wasted.

The present invention substantially eliminates down time due to splicing and also enables the maintenance of registry and hence avoids wastage. The invention contemplates the accumulation of a loop in the operating web preliminary to the splicing and the instantaneous stopping of the progress of the two webs at the point of splice back of the loop and the effecting of the splice while the press mechanism is consuming web from the loop. During this operation the press may be slowed down, and thus the quantum of accumulation be kept within reasonable bounds, without impairment of registry.

According to the invention automatic mechanism operates to effect a splicing in a very short time, approximately a second. The splicer includes a pair of clamps which clamp the two webs together and holds that portion between them stationary, and a carriage which is traversed across the webs and carries shearing cutters, scrap removers, web alining shoes and tape applicators. Compressed air is preferably employed as the motive power and the initiation of the movement of the carriage in both directions is manually controlled. The invention also contemplates proper timing of the sequence of operation of the successive steps.

The invention also comprehends various details in the construction and mode of operation of the splicer mechanism, all of which will be more fully understood from the following specific description of the embodiment of the invention illustrated in the accompanying drawings in which Fig. 1 is a diagrammatic view of the splicing and associated mechanism illustrating the relation of the splicer mechanism to the total blank forming operation.

Fig. 2 is a diagrammatic perspective view of the principal elements of the splicer.

Fig. 6 is a side elevation of the splicer as viewed from the web emerging side which is the front or operator's side, with the carriage and parts carried thereby omitted.

Fig. 7 is a plan of the parts shown in Fig. 6, with the outline of the webs indicated.

Fig. 8 is a transverse sectional elevation on enlarged scale of the complete splicer, taken on the line 8—8 of Fig. 9.

Fig. 10 is a sectional plan of the left end portion of the complete splicer on line 10—10 of Fig. 9, showing the lower splicer mechanism.

Fig. 11 is a longitudinal sectional elevation taken on line 11—11 of Fig. 8 but showing the carriage and parts thereon traversed half way across the web.

Fig. 12 is a fragmentary plan of a portion of the main cylinder and of its rack and operating pinion and associated parts.

Fig. 13 is a fragmentary perspective of the upper half of the splicer with the carriage in substantially the position shown in Fig. 11.

Fig. 14 is an enlarged sectional elevation on the line 14—14 of Fig. 9, showing the cutter mechanisms.

Fig. 15 is a view similar to Fig. 14 with the cutters moved to shearing relation.

Fig. 16 is a detail in sectional elevation on the line 16—16 of Fig. 15.

Fig. 17 is a longitudinal sectional elevation substantially on the broken line 17—17 of Fig. 18.

Fig. 18 is a transverse sectional elevation on the line 18—18 of Fig. 17.

Fig. 19 is a detail in sectional elevation on the broken line 19—19 of Fig. 17.

Fig. 20 is an enlarged transverse sectional elevation on line 20—20 of Fig. 9.

Fig. 21 is a fragmentary detail in elevation of parts in the drive train between a rack and an applicator drum, showing a modified construction.

Fig. 22 is a sectional elevation of the same on line 22—22 of Fig. 21.

Figures 4, 5:
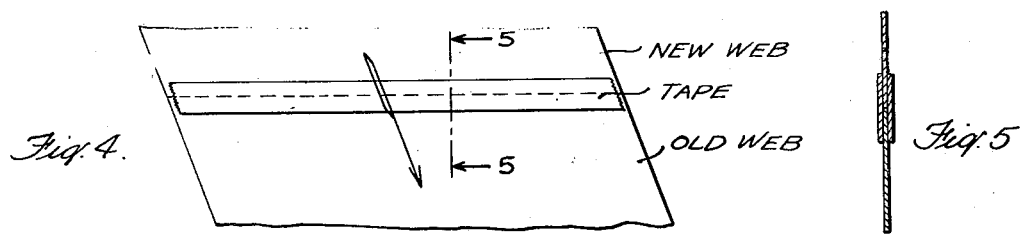
Fig. 4 is a fragmentary plan of the spliced ends of two webs including the splice joint.
Fig. 5 is a section on the line 5—5 of Fig. 4, somewhat enlarged.

The general principle of operation will be first described by reference to the diagrammatic views Figs. 1 to 3, inclusive, and the description of the splicer in detail will follow.

The roll stand is of the reversing type, having two pairs of core plugs for rolls to be mounted on both ends of a reversible frame, thus enabling the immediate placement of a full roll of paperboard when one has been used up.

As shown, the old roll, the one on the bottom from which the running web is being drawn, is nearing exhaustion and the leading end of the web from the new roll has been fed through the guide rolls and into the splicer on top of the old web.

From the splicer the web passes through loop accumulating means and thence through feed rolls to and through successive printing and blanking presses which are suggested in Fig. 1 by a fragmentary outside view of a housing bearing the legend "First Color Unit." In practice, there are commonly from three to five successive color units followed by the blanking unit which cuts, creases and stacks the blanks.

The loop accumulator includes a take-up tower of indefinite height formed generally of structural steel and disposed on top of the pull roll stand which has two power driven rolls through which the web is drawn from the splicer. Thence the web passes over a take-up roll in the tower which is fed up and down racks in the tower by power means not shown. From the take-up roll, the web passes through power driven auxiliary pull rolls to the feed rolls for the first color unit.

Instead of vertical loop accumulating means it is obvious that the loop may be formed horizontally where height is a consideration. When the take-up roll moves up or out to form a loop, the speed of the pull rolls is increased above that of the auxiliary pull rolls to draw in the web at a sufficiently accelerated speed to allow of the formation of the loop without affecting the availability of web for the presses. During this operation the auxiliary pull rolls keep the forward portion of the loop under tension. This loop forming is under the control of a push button (not shown), and may be operated at any time between splices. Once the loop is formed the speeds of the pull rolls are equalized so as merely to maintain the loop.

Some time during the running of a web from one roll, the new web is fed into the splicer as shown in Fig. 1. Ordinarily this will be toward the end of the old roll. When the time comes for the splice, the operator first slows down the presses, which have been running at, say, 500 feet per minute, to, say, 125 feet per minute or one-quarter of the running speed. Then the operator throws a lever on the splicer which admits compressed air to the operating mechanism and traverses a carriage diagonally across the two webs, first stopping the pull rolls, thus halting the progress of the web back of the loop, and then closing clamps on opposite sides of the carriage. In other words, the web in the splicer is stationary during the act of splicing. Two rolls or drums on the carriage are loaded with pressure sensitive adhesive tape, of which scotch tape is an example. Cutters on the carriage precede these applicator drums and sever the two webs, and curved members comparable to the moldboards of plows lift away the severed ends of the webs so as to bare the joint for the application of tape. Immediately behind the plow elements are cooperative shoe elements that bring the two edges of the webs into line or abutting relation, and behind these roll the drums which apply their tape on top and bottom of the joint. A reversal of the lever brings the carriage back to starting position where the old drums may be replaced by loaded drums ready for the next splicing. In actual practice the splicing takes about a second and hence the presses are slowed down for only an inconsequential time.

Figs. 4 and 5 show a short section of web length including a spliced joint. With the web traveling in the direction of the arrow the section back of the joint will be the leading end of the new web and the section ahead of the joint will be the tail end of the old web. A strip of adhesive tape is applied over the joint on both sides of the web, and it is planned to have the tapes end slightly short of the edges of the web, as shown. The joint is at a slight oblique angle across the web so as to distribute the added thickness progressively across the web as the joint passes through the bite of the following rollers. The angle is preferably about 20° to a line perpendicular to the edge, and, as will be seen, the splicer is set at about that angle transversely of the web.

The elements of the splicing mechanism are shown diagrammatically in Fig. 2 and their general construction and operation will be described with reference to that figure. The carriage has an upper and a lower section which are identical except that they are reversed in position, receiving the web between them and acting on opposite sides thereof. There are two plates, each carrying its respective parts, the bottom plate being moved back and forth by an air operated pinion that engages with a rack on the bottom plate. Angle irons, arranged as struts in V-formation, fasten the top and bottom plates together and cause the top plate to follow the bottom plate. Fixed racks alongside the two plates are engaged by gears on the respective plates which act to drive the mechanism as the carriage is traversed. As will later be described more in detail, with the carriage at its initial position, the throwing of a lever admits air through a control valve into the system which first brings the cutters together in shearing relation and closes the clamps, and then enters a main cylinder and starts the movement of the drive pinion which in turn starts the movement of the carriage. The main shaft on each plate is rotated by engagement of the gears in the racks, and the applicator drums are connected to be driven by these shafts. Also a sprocket take-off drives the cutters which are rotary. The lever is automatically returned to neutral at the end of the travel, and the reversal of the lever reverses the carriage and brings it back to its initial position where the lever is again returned to neutral.

Specifically, as shown in Fig. 2, to make a splice the operator throws the control lever 1 to the right, thereby operating the control valve 2 to move the arm 3 to the left against the rear pin on the control block of rod 4. As will later be explained in connection with Fig. 3, this admits air to cylinders 5 and 6 of the upper and lower rotary cutters 7 and 8, respectively. This actuates the pistons which carry the cutters and brings the cutters into shearing relation. Also in controlled time air is admitted to cylinders 9 and 10 of clamps through which the webs are disposed and closes the clamps. Then in timed sequence air is admitted to the left end of main cylinder 11 which moves its piston to the right. A pinion 12 on this piston engages in fixed rack 13 and is thus rotated. Rack 14 on bottom plate 15 engages with pinion 12 and therefore the bottom plate moves double the distance of the pinion. The bottom plate 15 is attached to the top plate 16 by V-arranged struts 170 and hence the two plates are moved in unison. The movement of the cutter is about 20° to the direction transversely normal to the longitudinal axis of the webs, the obliquity being in the direction of movement of the web, which is toward the right in Fig. 2, as indicated by the arrow on the web.

The splicing mechanism on the top plate 16 will be described, the plate being broken away in Fig. 2 to reveal the mechanism carried on its under side. The cooperative mechanism carried on the top side of the bottom plate 15 duplicates that on the top plate, being merely reversed in position, and the parts will be given corresponding numbers with an identifying letter.

Fixed on the frame alongside the upper plate 16 is a rack 17, a corresponding rack 17a being related to the bottom plate 15. A shaft 18 is hung from the carriage plate and on its outer end bears a gear 19 which engages in the rack and is rotated as the carriage is traversed. This drive is transmitted to a gear on a parallel main shaft 20 through reduction gearing comprising the small gear 21 fixed to gear 19 and large gear 22 loose on the main shaft.

Fixed to the gear 22 is a sprocket wheel 220 which has drive connection through sprocket chain 23 with sprocket wheel 24 on the cutter shaft 25. The ratio between sprocket wheels 220 and 24 is such as to give the cutters an overspeed. Inasmuch as the cutters are moved toward and from each other, a spring tensioned idler 26 operates to take up slack in the chain as the cutter moves, being mounted on a pivoted arm 27 which is biased by coil spring 28.

On the inner end of the shaft 20 is the applicator drum or roll 29 and the bearing for that end of the main shaft is in one end of a bell crank 30 which pivots on shaft 18 adjacent its inner bearing 31, the other end of the bell crank being tensioned by coil spring 32 to urge the applicator drum toward the web while accommodating itself to different thicknesses of web.

The applicator drum is mounted to turn on shaft 20 and is driven through means which allow for lost motion between the sprocket wheel 220 and the drum. This is because it is necessary that the rotation of the drum be deferred after the carriage starts its traverse until the drum almost reaches the edge of the web, allowing just enough rotation to bring the leading end of the tape down directly under the axis of the drum when that axis is over the point where the laying of the tape is to begin.

To obtain this lost motion or deferred rotation of the drum, the sprocket wheel 220 is provided with a drive pin 33 that coacts with a pivoted dog 34 on a disc member 35 also mounted to turn on shaft 20. The disc 35 is fastened to a heart cam 36 which also bears on shaft 20 and is non-rotatively secured to the drum. A detent 37 is urged by spring 38 against the peripheral edge of the heart cam and serves to bring the drum to its initial angular position. Through this connection the drive to the drum is not effective until the pin 33 engages the dog 34 which is spring biased into the path of the pin in the driving direction, while it will yield when the pin turns in the other direction, and thus permit the return traverse of the carriage without rotation of the drum.

The pinion 12 bears in a sliding support or carriage (not shown in Fig. 2) which carries a projecting finger 39. On the rod 4 are two adjustable abutment members or lugs 40 and 41. When the lever 1 is thrown to the right, the valve arm 3 hits pin 42 and slides rod 4 to the left. The pinion 12 travels along rack 13 until the finger 39 hits lug 41 and slides rod 4 to the right, the pin 42 engaging arm 3 and restoring it to upright or neutral position, thus shutting off the valve and stopping the travel of the carriage. To return the carriage, the lever 1 is thrown to the left, thus moving arm 3 to the right and through pin 43, sliding rod 4 to the right. This admits air to the right end of cylinder 11 and causes the pinion 12 and finger 39 to travel to the left until finger 39 strikes lug 40 and returns the rod and hence the control valve to neutral position.

Figure 3:
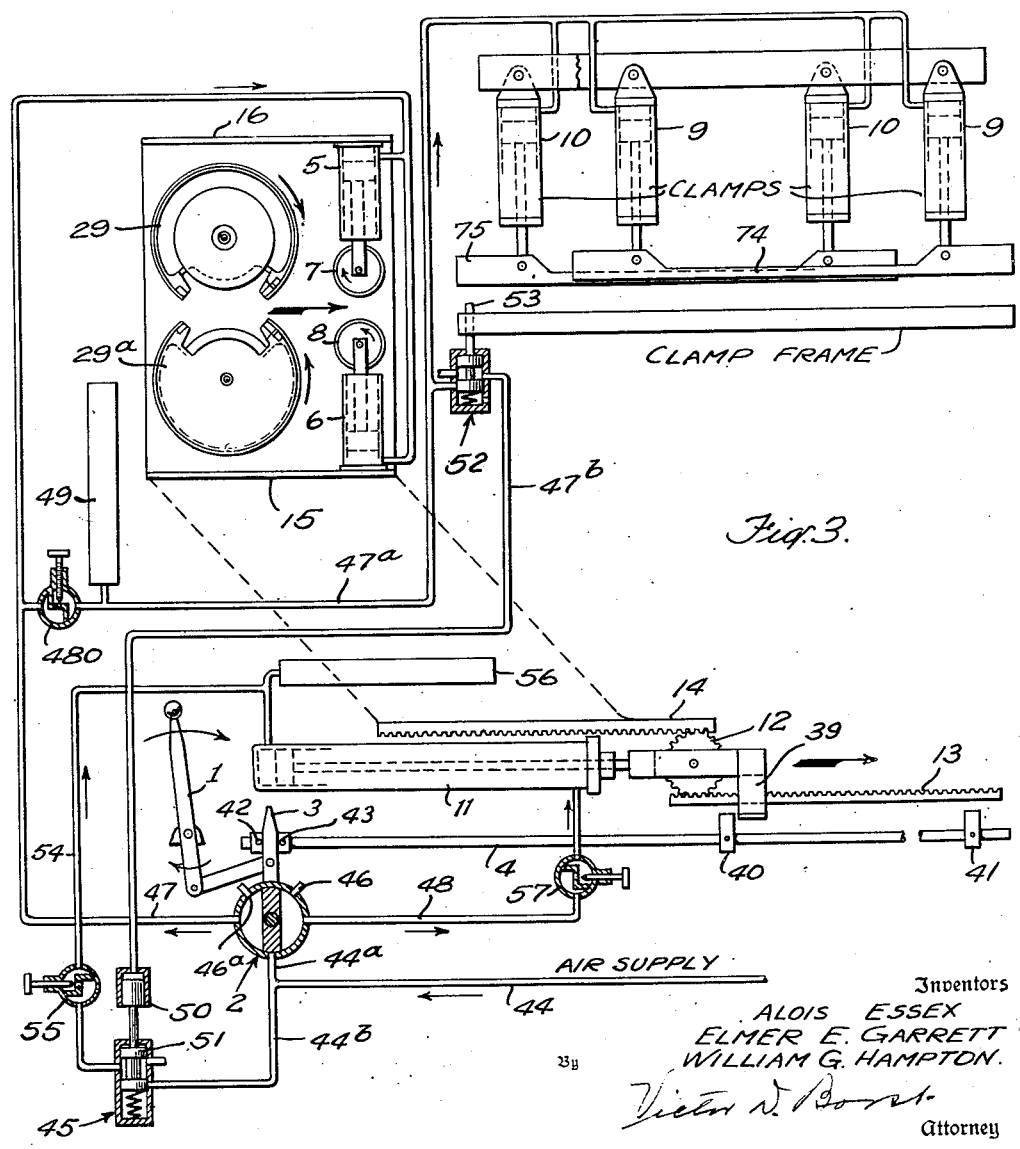
Fig. 3 is a diagram of the air system and of the parts immediately controlled thereby.

The air system is diagrammatically represented in Fig. 3. The air supply line 44 branches, one branch 44a leading to the control valve 2 and the other branch 44b leading to a piston type of two-position cylindrical valve 45 the function of which will appear. The valve 2 is of the rotative type and is a three-position valve. The casing has two exhaust ports 46 and 46a and two conduits 47 and 48 lead off from opposite sides of the casing. When the arm 3 is upright the valve is in neutral position at which the rotative valve element closes the admission port from the air supply and the two chambers are vented.

The conduit 47 leads to the operating ends of cutter cylinders 5 and 6, and a branch 47a from this conduit leads to the operating ends of the four clamp cylinders 9 and 10. In this branch conduit is a speed control valve 480, and a capacity chamber 49 communicates with the conduit after the valve 480, the function of which is to absorb the pressure until it is built up to operating value.

From the branch conduit 47a leads another branch conduit 47b which leads to a cylinder 50 in which is a piston the stem of which is attached to a double piston valve 51 in valve cylinder 45. The piston 51 is biased to the shut off position shown, as by spring means.

In the branch 47b is a shut off valve 52 which is of the double piston type, a spring biasing the piston to the closed position shown, and a finger 53 on the piston projects into the path of one of the clamps, so that just at the limit of movement of the clamps the valve 52 is opened. The valve 52 is also a two-position valve. In its biased position the admission of air from branch 47a is shut off and the branch 47b is vented to exhaust as shown. When the clamp contacts finger 53 and opens the valve against its bias, the upper piston shuts off the exhaust and branch 47a is connected to branch 47b between the two pistons.

This air pressure on top of piston 50 moves piston 51 down against its bias, and the upper piston element shuts off the exhaust and branch 44b is thus connected to a conduit 54 which leads to the left end of cylinder 11 and has in it a speed control valve 55 and a capacity chamber 56 having the same function as chamber 49.

The conduit 48 leads to the right end of cylinder 11 and has in it a speed control valve 57.

It will be seen that when lever 1 is thrown to the right the rotative valve part of valve 2 is rotated to the left. This uncovers the port of branch 44a and closes the exhaust port 46a and admits air to conduit 47. The cutters 7 and 8 are thus brought together in shearing relation. Following this in timed relation controlled by valve 48b the clamps close. This movement opens valve 52 which in turn opens valve 45 and admits air to the left end of cylinder 11 in properly timed relation controlled by the valve 55. The air pressure moves the piston and hence pinion 12 to the right, the rack 14 and hence the carriage moving twice as far. At the limit of its movement finger 39 strikes lug 41 and slides rod 4 over until pin 42 erects arm 3 and shuts off valve 2.

This vents cylinders 5, 6, 9 and 10 through exhaust port 46a and allows the cutters and clamps to retract, the splice having been made as the carriage traversed. To return the carriage, the lever 1 is thrown to the left. This operates the valve 2 to the right and connects conduit 48 to pressure, closing the exhaust port 46, and this pressure moves the piston in cylinder 11 to the left and restores the carriage to its initial position. The rod 4 had been moved to the right when the lever 1 was thrown to the left, and finger 39 strikes lug 40 at the limit of return travel of the pinion 12 and restores the rod and hence through pin 43 the valve and lever to neutral position.

The actual construction of the commercial splicer is shown in the mechanical views. In Figs. 6 and 7 is shown the main structure with the movable carriage and parts carried thereby omitted. The frame is composed principally of angle irons, having four uprights 58, 59, 60 and 61 with transverse or fore and aft braces at each end top and bottom, numbered 62 at the top and 63 at the bottom. Running longitudinally of the frame are four angle irons which support the tracks for the carriage, the two top ones being numbered 64 and 65 and the two bottom ones being numbered 66 and 67. These support tracks 68, 69, 70 and 71, respectively. On the under side of track 68 is the rack 17 and on top of track 71 is rack 17a.

Between the longitudinal frame members 65 and 67 on the front or exit side is a clamp frame member 72, and between the members 64 and 66 on the entrance side is a clamp frame member 73. Clamp operating cylinders 9 are supported on frame member 65 and clamp operating cylinders 10 are supported on frame member 64. The pistons in cylinders 9 are attached to clamp 74 and the pistons in cylinders 10 are attached to clamp 75. Springs 76, which are attached to pins on the frame members 64 and 65, retract the clamps which are guided at their ends in U-shape guides 77.

As shown in Figs. 6, 8 and 12, an inverted channel member 78 forms the support for the main air cylinder 11 and for the rack 13, and uprights 79 from this base support two spaced longitudinal tracks 80. A sliding bearing frame 81 in the side pieces of which the pinion 12 bears, has cross heads which bear on the top and bottom of tracks 80, and the piston stem 11a is attached as by screw threads to the bearing frame 81, as shown in Figs. 11 and 12. Thus the movement of the piston is transmitted to the pinion 12. The finger 39 is secured on the forward top cross head of this bearing frame.

The rod 4 is guided in a pair of brackets 82 which are attached to the bed member 78 (Figs. 6 and 12). As indicated particularly in Fig. 12, the stop lugs 40 and 41 and the pins 42 and 43 are adjustable to obtain the proper operative settings.

The web is guided through the frame over the clamp frame members 73 and 72. To support the web at its entrance and exit, rollers are provided. As shown, a roller 83 is provided at the entrance side and a roller 84 at the exit side. These rollers are supported on brackets on the upright frame members and, as shown, are offset with respect to the fore and aft center line of the splicer frame so that the web passes through at an angle of about 20°, as indicated in Fig. 7. Optionally the axes of the rollers may be normal to the center line of the web instead of parallel to the splice, which is the condition shown.

The bottom carriage plate 15 is guided and supported by rollers on the lower tracks 70 and 71. As shown this plate has an elongated block 85 secured as by welding on its under side and is of the same length as the track 14 which is attached to its underside, the track and block being of the same length and somewhat longer than the plate 15. At their far ends the tracks 70 and 71 are provided with stops 86 which are secured to the frame pieces 66 and 67 and prevent the carriage from overrunning.

The struts 170 connect the lower plate 15 with the upper plate 16 of the carriage. This upper plate is guided and supported by rollers on the upper tracks 68 and 69. Another support for the web intermediate the rollers 83 and 84 is provided during the splicing by a horizontal arm 170a of the connector struts which extends from the apex of the V-structure and is an angle member with a flat face upward and having a flat extension piece 87 on its end. As will be seen, particularly from Fig. 9, this piece 87 is substantially in the plane of the bottom face of the web and is slightly forward of the line of cut as the web travels, as appears in Figs. 10 and 14. This piece 87 is partially under the web in initial position and moves along under the web ahead of the cutters as the carriage traverses. It therefore supports the rear end of the old web after the severing and holds it in its plane until the shoes come along to line up the two web ends and hold them until the applicator rolls follow on behind and apply the tape. We will see that the end of the old web back of the cut and the end of the new web ahead of the cut are plowed away and removed. This would leave the end of the new web back of the cut unsupported, but, as will appear, separator fingers between the two webs are provided on the two sides of the cut, and the new web end will rest on the finger on its side of the cut until the shoes reach it and line it up with the old web. It is supported by the shoes in this position until the applicator rolls arrive and perform their function.

The cutter advancing and retracting mechanism is shown in enlarged sectional detail in Figs. 14, 15 and 16, and reference is also made to Figs. 8, 9, 11 and 13. Fig. 14 shows the cutters in retracted position and Fig. 15 shows them in shearing position.

The upper cylinder 5 is supported on the under side of the upper carriage plate 16 and is contained within a housing including side plates 88 and 89, with a bracket plate 90 extending laterally from the front edge of the plate 89 for the support of the plow, as will later be described. The conduit 47 communicates with a port behind the piston 91 the lower end of the rod of which acts as a plunger to force the cutter 7 down against its upward bias.

The carrier for the cutter and its bearing functions at the end of its down movement to slide the cutter 7 axially toward its cooperative cutter 8 into shearing relation. As shown, the cutter 7 is mounted on the end of a shaft 92 (same as shaft 25 in Fig. 2) which is splined in a sleeve 93 (Fig. 14) which in turn is splined in a sleeve 94 which constitutes the hub of sprocket wheel 24. The sleeve 94 has ball bearings the outer races of which are in housings 95 fixed in a vertically slidable housing 96 which is guided by gibs 97.

On its forward end just back of the cutter 7, the shaft 92 is provided with a ball bearing 98 (Fig. 16), and the housing 99 for the outer race of this bearing has a peripheral groove into which bear pins of a forked member 100 on a pivoted lever plate 101. This plate and the forked member constitute a bell crank lever, the plate being pivoted in the upward extensions of the side plates of housing 96. This plate 101 is biased to the raised position shown in Fig. 14 by spring 102 which is attached to a pin on the free end of the plate and at its upper end to a pin on a block 103 on plate 88.

Also the cutter 7 and its vertically slidable housing or bearing structure 96 are further biased to raised position by spring 104 which is attached at its lower end to a pin on an arm 105 secured on top of the slidable cutter housing and at its upper end to the carriage plate 16 (Fig. 11).

Across the bottom of the frame structure for the cutter cylinder and slidable housing is a piece 106 having a stop pin protruding slightly above its upper surface. When the chamber in cylinder 5 above the piston is vented to air, the springs 102 and 104 hold the cutter 7 retracted and the lever plate 101 raised as shown in Fig. 14. When air under pressure is admitted above the piston, the piston and rod 91 move down. Spring 102 is somewhat stronger than spring 104 and therefore the lever plate 101 remains elevated during the descent of the cutter until the housing 96 strikes bottom. Then the further movement of the piston depresses the plate 101 and operates the forked levers 100 to move the cutter 7 to the right as seen in Figs. 14 and 15, thus bringing the two cutters into the shearing relation shown in Fig. 15. The deferment of this axial movement of cutter 7 until the overlap position is reached is necessary to avoid clashing of the cutters as they are brought together.

Figure 9:
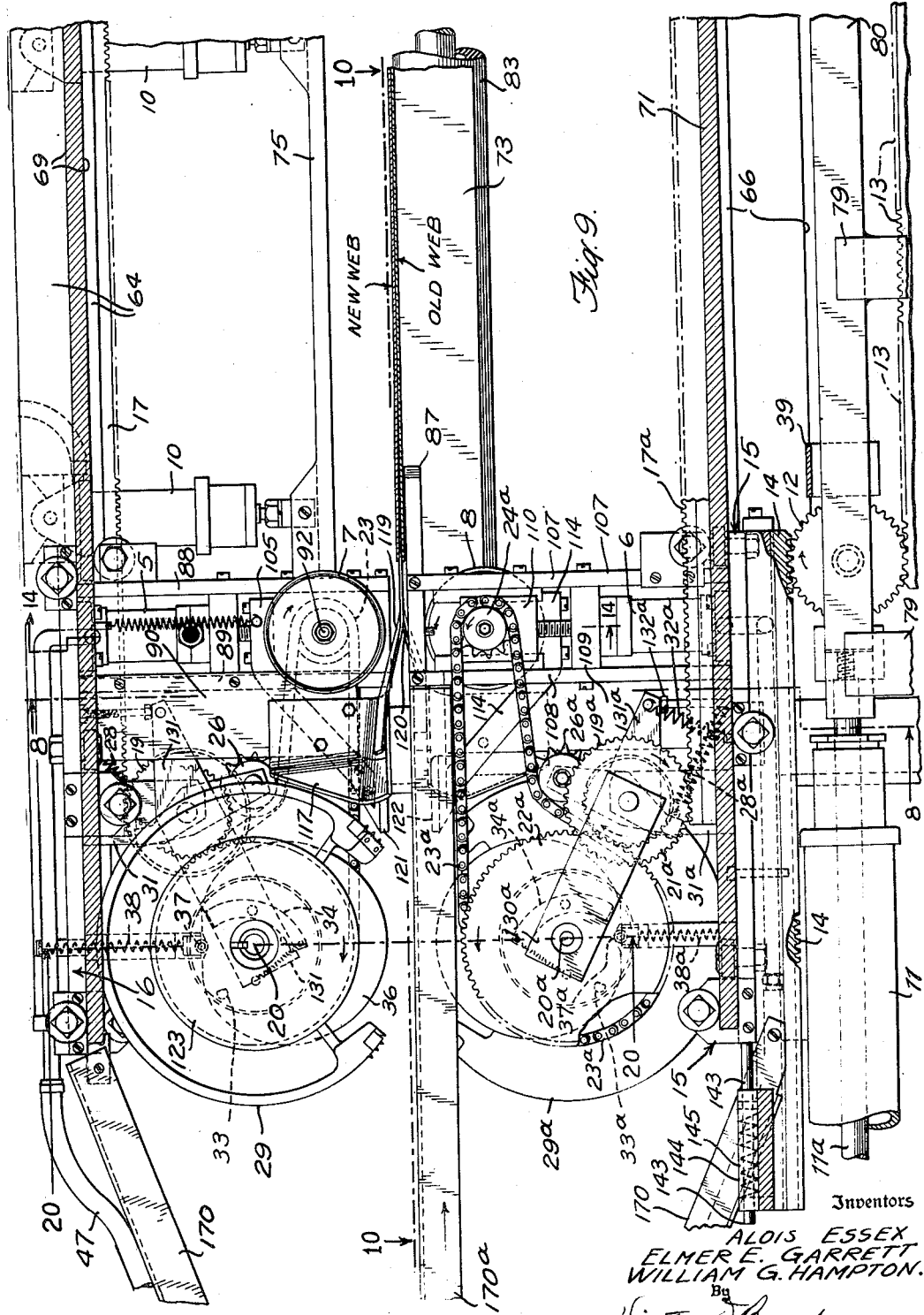
Fig. 9 is a longitudinal sectional elevation of the same on the broken line 9—9 of Fig. 8, showing the carriage in its initial position.
Figure 23:
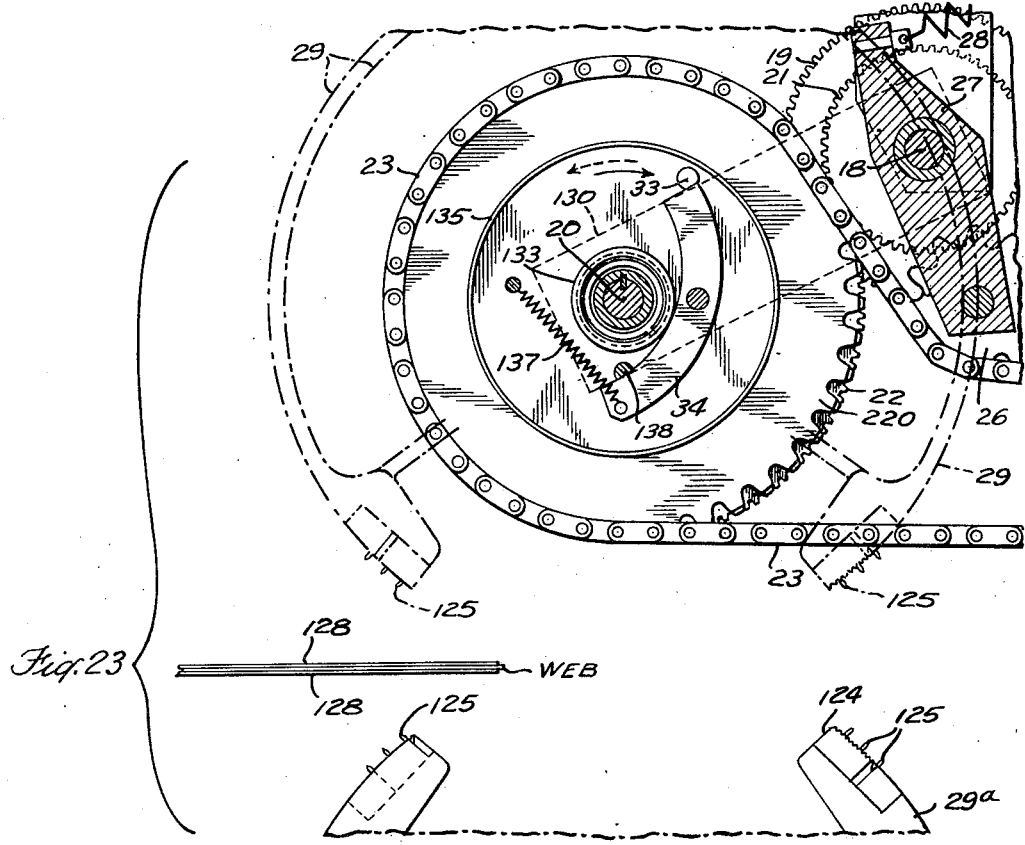
Fig. 23 is a fragmentary detail in sectional elevation showing the relative positions of the applicator drums at the end of their operative traverse.
Figure 24:
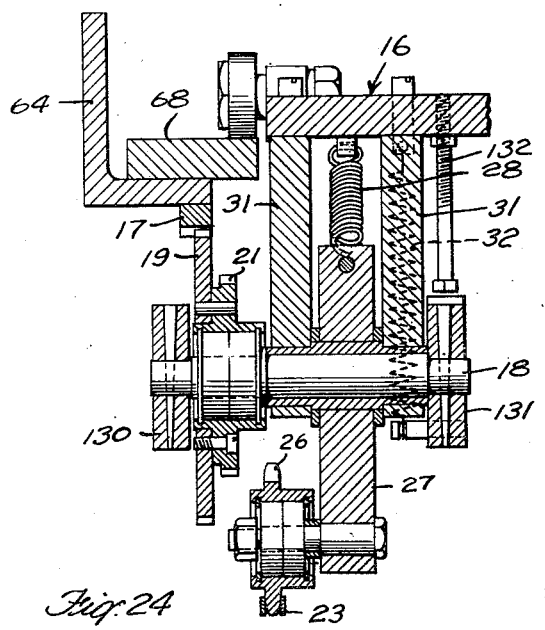
Fig. 24 is a sectional detail in elevation substantially on the section line 24—24 of Fig. 11.
Figure 25:
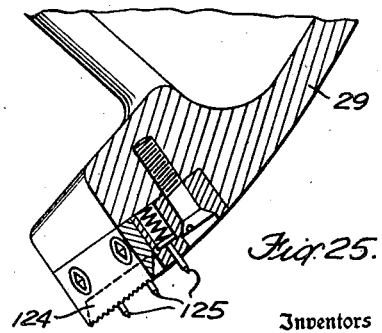
Fig. 25 is a sectional detail of a fragmentary portion of the upper applicator roll showing the tape holding means.

The air cylinder 6 for the lower cutter 8 is mounted on top of the lower carriage plate 15, as indicated in Figs. 8 and 9. Side plates 107 and 108 correspond to side plates 88 and 89, and a bracket plate 109 is disposed parallel with the corresponding upper plate 90, being attached to the rear edge of plate 108.

The bearing housing 110 for the cutter 8 and its shaft is generally similar to that for the cutter 7 without the bell crank. A coil spring 111 around the cutter shaft urges the cutter out to a stopped position so as to give the necessary spring effect for shearing. The piston rod 112 has a permanent attachment to the housing 110 and a retractile spring 113, which assists gravity, is attached at its upper end to a pin on an arm 114 secured on the lower side of housing 110, and at its lower end to the plate 15, as shown in Fig. 8. Gibs 115 on plates 107 and 108 guide the housing 110 in its vertical movement, and an adjustable screw stud 116 in the extension plate 87 acts as a stop for the cutter in its upward movement.

The bracket plates 90 and 109 carry the plow members and the arms 105 and 114 carry the shoes for bringing the edges into line. The top plow member 117 is attached on the lower end of bracket plate 90, as shown in Figs. 9, 11 and 13, and the lower plow member 118 is attached on the upper end of bracket plate 109, as shown in Figs. 10 and 11. The plow members both carry a forwardly extending finger which enters between the two webs. The finger for the upper plow is numbered 119 and the finger for the lower plow member is numbered 120. As shown in Fig. 8, these have their ends side by side on opposite sides of the line of cut and finger 119 will momentarily support the end of the new web. Also, as shown in Fig. 9, in the initial position of the carriage, the ends of the fingers slightly overlie the edge of the running web so that when the end of the new web is laid on, the ends of the fingers will be between the two webs. The fingers are flat spring members susceptible of being properly shaped and yielding during the cutting as indicated in Fig. 15. Since the plow members of the top and bottom sections are identical but reversed, the finger 119 is fastened on top of plow 117 and finger 120 is fastened on the bottom of plow 118.

The arm 105 extends rearwardly and downward and has secured on its end the top shoe member 121, and the arm 114 extends rearwardly and upward and has on its end the lower shoe member 122 in opposing relation to the top shoe member. These shoes are so disposed that they trail right behind the plow and the cutters in the splicing traverse of the carriage. They move apart with their respective cutters, as shown in Fig. 9, and they come together with their cutters, as shown in Fig. 11. When together, the spacing is such that they guide but do not frictionally engage the web surfaces. Their front edges are beveled so as to take in the webs when out of alinement and bring them into alinement.

The upper and lower applicator rolls or drums 29 and 29a have their axes in a vertical plane directly behind the shoes, and spaced so that each drum periphery rolls in contact with its side of the splice joint. The drums are closed at their outer ends, that is, the ends from which the drive